United States Patent

[11] 3,569,781

| [72] | Inventor | Richard W. Strachan<br>Providence, R.I. |
| [21] | Appl. No. | 787,644 |
| [22] | Filed | Dec. 30, 1968 |
| [45] | Patented | Mar. 9, 1971 |
| [73] | Assignee | Texas Instruments Incorporated<br>Dallas, Tex. |

[54] MOTOR PROTECTION CIRCUIT
16 Claims, 5 Drawing Figs.

[52] U.S. Cl. .................................................. 317/13,
317/33, 317/41, 318/473
[51] Int. Cl. .................................................. H02h 5/04
[50] Field of Search............................................ 317/13.3,
13.2, 41, 33 (SCR); 318/473; 307/305 (A)

[56] References Cited
UNITED STATES PATENTS
| 3,071,718 | 1/1968 | Gordon .......................... | 318/473 |
| 3,366,843 | 1/1968 | Evalds........................... | 317/41X |
| 3,404,313 | 10/1968 | Happel et al................... | 317/13 |
| 3,457,460 | 7/1969 | Buiting et al................... | 317/13 |

*Primary Examiner*—James D. Trammell
*Attorneys*—Harold Levine, Edward J. Connors, Jr., John A. Haug and James P. McAndrews ABSTRACT: Apparatus controls the energization of an electrical load and is responsive to overheating of the load for protective deenergization thereof. The apparatus includes a gate triggerable semiconductor current switching device interconnected with means for energizing the electrical power load in response to conduction between the main terminals of the device. A thermistor thermally coupled to the load is interconnected with the gate terminal of the device for controlling the flow of triggering current thereto. Means is provided which is interconnected with the thermistor for initially supplying triggering current to initiate conduction between the main terminals of the device and then to supply a triggering current to latch the device in a conductive state. The thermistor reduces the triggering current to the device thereby to deenergize the load if heated above a predetermined threshold by overheating of the load.

Richard W. Strachan,
Inventor.

MOTOR PROTECTION CIRCUIT

The invention relates to apparatus for controlling the energization of an electrical load and more particularly to such apparatus which is responsive to overheating of the load for protective deenergization thereof.

Heretofore, thermal protection of electrical power loads such as electric motors and the like has usually been provided by snap-action or other bimetallic thermostatic devices. Such mechanical thermostatic devices are advantageous in many types of applications. However, in some applications there may be a need for greater accuracy, freedom from calibration shifts or insensitivity to variations in the supply voltage or the ambient temperature of the use environment than is provided by such devices.

Accordingly, among the several objects of the invention may be noted the provision of control apparatus which employs a semiconductor current switching device for controlling the energization of an electrical load; the provision of such a control employing a thermistor to accurately sense overheating of an electrical load for protective deenergization thereof; the provision of such a control including means for resetting the control after it has protectively deenergized an electrical load; the provision of such a control including means for resetting the control only after a protectively deenergized electrical load has been permitted to cool from a heated condition; the provision of such a control providing for either manual or automatic reset of the control after it has protectively deenergized an electrical load; the provision of such a control including time delay means for preventing reenergization of an electrical load until a predetermined delay following protective deenergization thereof by the control; the provision of such a control which is not prone to shifts in calibration and which provides for accurate and reliable protective deenergization of an electrical load; and the provision of such a control which is relatively simple and economical to manufacture. Other objects and features will be in part apparent and in part pointed out hereinafter.

Briefly, apparatus of this invention controls the energization of an electrical load and is responsive to overheating of the load for protective deenergization thereof. The control accordingly comprises a triggerable semiconductor current-switching device having main and gate terminals. Conduction between the main terminals of the device is initiated by applying a triggering current to the gate terminal and is terminated when the triggering current is reduced below a predetermined triggering level. Means is interconnected with the current-switching device for connection across an AC power source and energizes the load in response to conduction between the main terminals of the current-switching device. A thermistor is thermally coupled to the load and is interconnected with the gate terminal of the device for controlling the flow of triggering current thereto. Interconnected with the thermistor is means for supplying a triggering current for the device. This means is operative initially to supply triggering current for initiating conduction between the main terminals of the switching device when the apparatus is connected across the AC power source and then to supply triggering current for latching the device in a conductive state. If a rise in the temperature of the load heats the thermistor above a predetermined threshold, the thermistor reduces the triggering current below the predetermined triggering level and thereby protectively deenergizes the load.

The invention accordingly comprises the constructions hereinafter described, the scope of the invention being indicated in the following claims.

In the accompanying drawings, in which several of various possible embodiments of the invention are illustrated, FIG. 1 is a schematic circuit diagram of control apparatus of this invention including a triac for controlling the energization of a load, and a thermistor which senses the temperature of the load for controlling triggering of the triac;

Corresponding reference characters indicate corresponding parts throughout the several views of the drawings.

Figure 1:
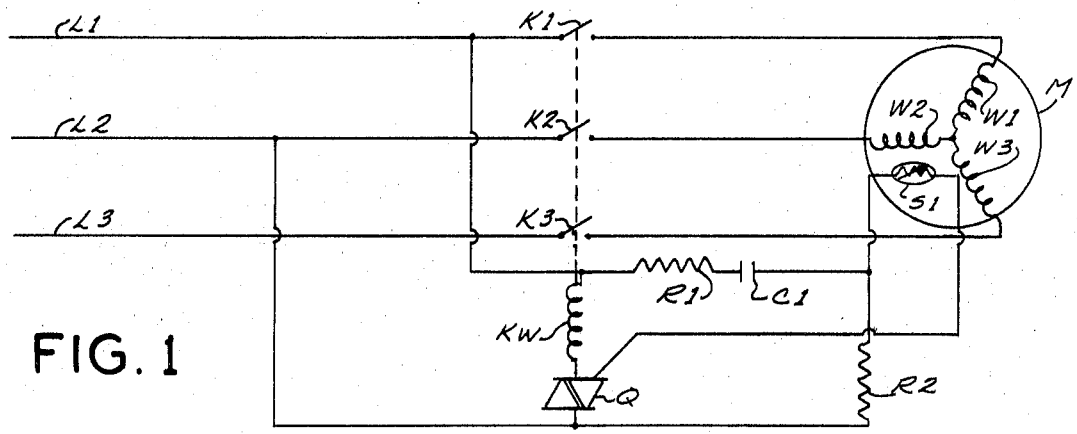

Referring now to FIG. 1, there is shown the schematic circuit diagram of apparatus of this invention for controlling the energization of an electrical load. The load is illustratively represented as a conventional three-phase motor M having individual phase windings W1, W2 and W3. Three supply leads L1, L2 and L3 provide means for connecting the motor and the control apparatus to a conventional source of three-phase power (not shown). The control is provided with a triac Q. A triac, as is known to those skilled in the art, is a member of the family of gate-triggerable semiconductor current switching devices. This family also includes a variety of similar devices such as, for example, the silicon-controlled rectifier (SCR) and the silicon-controlled switch (SCS). Triac Q includes a pair of main terminals and a gate terminal, conduction between the main terminals being initiated by applying a triggering current to the gate terminal and being terminated when the triggering current is reduced below a predetermined triggering level.

Connected in series with the main terminals of triac Q across leads L1 and L2 is the winding KW of a conventional contactor. Leads L1 and L2 therefore provide the apparatus with a single-phase connection of the AC power source. The contactor includes a set of normally open contacts, K1, K2 and K3 which are adapted to close when winding KW is energized. When closed, contacts K1, K2 and K3 supply three-phase power to the windings W1, W2 and W3 of motor M. As will be seen, winding KW provides means for energizing motor M in response to conduction between the main terminals of triac Q.

A thermistor S1 is thermally coupled to motor M and is interconnected with the gate terminal of triac Q for controlling the flow of triggering current thereto. Thermistor S1 is mounted for sensing the temperature in motor M, and is therefore thermally coupled therewith in any conventional manner. Thermistor S1 is of the type having a positive temperature coefficient (PTC) of resistivity, preferably having a transition above which the resistance thereof rises relatively abruptly. Means for supplying a triggering current for triac Q comprises a resistor R1 and a capacitor C1 serially connected between one side of an AC power source, i.e., supply lead L1, and one side of the thermistor S1. This means further comprises a resistor R2 connected between another side of the power source, i.e., supply lead L2, and thermistor S1.

Upon connection of leads L1, L2 and L3 to the three-phase AC power source, the control operates in the following manner. It is first assumed that motor M is not in a heated condition, i.e., is not at high temperature and that, accordingly, thermistor S1 is relatively cool so that its resistance is low. Thus when the AC power source is connected, triggering current for initiating conduction between the main terminals of triac Q is supplied by the connection from lead L2 through resistor R2 and thermistor S1 to the gate terminal of triac Q. When triac Q becomes conductive, contactor winding KW is energized by conduction between the main terminals of triac Q. Contacts K1, K2 and K3 of the contactor are thereby closed to energize the phase windings of motor M. After triac Q has been rendered conductive in this manner such that current begins to flow through the contactor winding KW, resistor R1 and capacitor C1 then become the source of triggering current for triac Q. In other words, resistor R1 and capacitor C1, by means of their interconnection with thermistor S1 to the gate of triac Q, comprise means for latching triac Q in a conductive state, i.e., a state in which conduction between its main terminals is recurrently maintained. This occurs because the inductance of contactor winding KW causes the current through triac Q to be out of phase with the gate voltage. Capacitor C1 provides an additional gate voltage phase lag to insure proper triggering of triac Q. Thus, if the inductance of winding KW is sufficient, capacitor C1 may be omitted.

If the temperature of motor M should rise, e.g., as a result of a locked rotor condition or overload, thermistor S1 is heated by the heating of motor M. Thermistor S1 is selected so that it has a transition temperature which corresponds to a predetermined maximum permissible temperature in motor M. Thus upon overload of motor M, if thermistor S1 is heated above a predetermined threshold level corresponding to the maximum permissible temperature in motor M, its resistance is increased so as to reduce the triggering current supplied to the gate terminal of triac Q below the predetermined triggering level. Triac Q thereby becomes nonconductive so that contactor winding KW is deenergized. Accordingly, contacts K1, K2 and K3 open to protectively deenergize the load.

When motor M cools sufficiently, thermistor S1 also cools so that it once more exhibits a relatively low resistance. Thus triggering current can flow through the path comprising resistor R2 and thermistor S1 to the gate of the triac Q, thereby triggering triac Q and energizing winding KW. Accordingly, contacts K1, K2 and K3 are closed to reenergize motor M. It is therefore apparent that resistor R2 provides means for resetting the apparatus after the load has been protectively deenergized and has cooled. In this manner, the control reenergizes the load only after it has cooled to some temperature less than the maximum permissible temperature. By varying the value of resistor R2, a limited degree of control over this reset temperature can be achieved.

It is to be understood that, while only a single thermistor, thermistor S1, is illustrated for sensing the temperature of the load represented by motor M, a plurality of thermistors may instead be employed. Thus, if the thermistors are PTC thermistors having a transition temperature above which the resistance thereof rises relatively abruptly, then several may be connected in series. Such thermistors may then be located so that they are thermally coupled to several of various points in a load at which it is desired to sense the temperature. Such "sharp-break" thermistors can quite effectively be used in such an application since when any one is heated to its transition temperature its resistance has a steep slope and therefore increases relatively abruptly so as to provide a substantial increase in the resistance of the series combination of thermistors.

Figure 2:
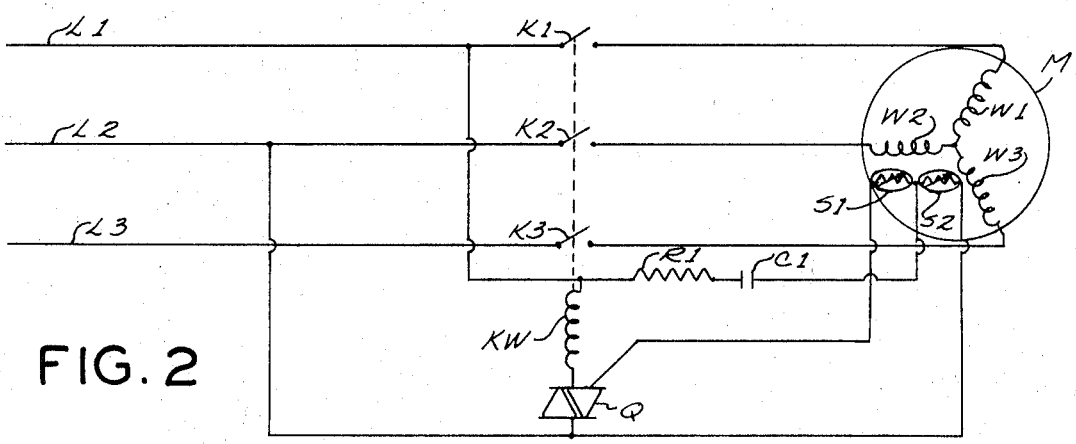
FIG. 2 is a schematic circuit diagram of control apparatus similar to that shown in FIG. 1 but additionally including means providing an automatic reset of the control when the load which is controlled has cooled to a desired reset temperature after it has been protectively deenergized.

In FIG. 2 is illustrated operating similarly to that of FIG. 1 but including, in addition, means providing an automatic reset of the control when the motor has cooled to a desired reset temperature. For this purpose, a second thermistor S2 is also thermally coupled to motor M to sense the temperature thereof. Thermistor S2 is used to provide the function of resistor R2 employed in the circuit of FIG. 1, and is mounted in motor M or buried in a winding of the motor. Thermistor S2 is also a PTC thermistor and preferably has a transition temperature above which the resistance thereof rises relatively abruptly. Its transition temperature is chosen to correspond with the desired reset temperature at which the load is to be reenergized following protective deenergization thereof.

The apparatus of FIG. 2 operates to initially energize motor M and then to protectively deenergize the motor in the same manner as the circuit of FIG. 1. However, the circuit is prevented from resetting so as to prevent reenergization of motor M as long as thermistor S2 remains heated above its transition temperature. When it cools sufficiently to allow triggering current to flow from lead L2 and thermistor S2 to the gate of triac Q, contactor winding KW is once more energized to close contacts K1, K2 and K3 and thereby to reenergize motor M. By employing a sharp-break thermistor material having a transition temperature for thermistor S2, a predetermined reset temperature for the motor may be attained with a high degree of accuracy. Thus, thermistor S2 operates to provide means for automatically resetting the temperature of the apparatus at a predetermined reset temperature, thereby providing for a desired temperature differential between protective deenergization of the load and subsequent reenergization.

Figure 3:
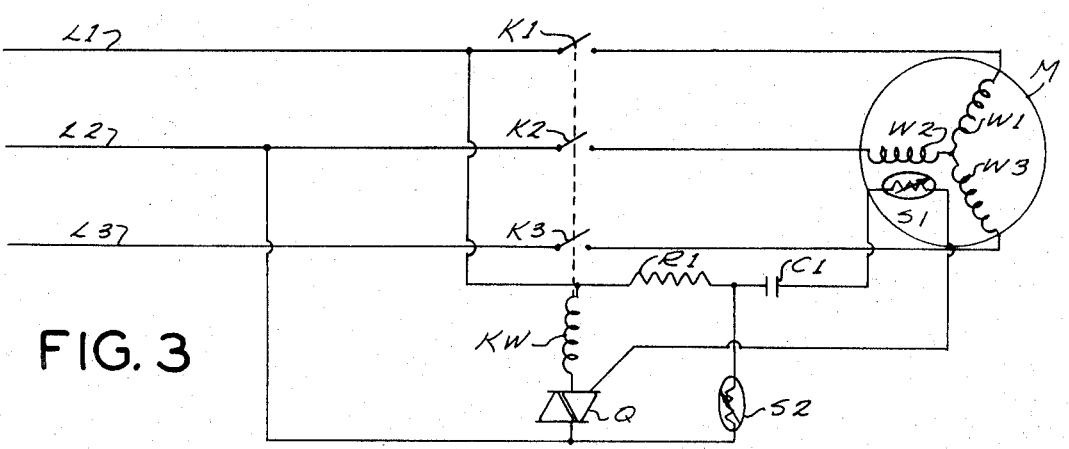
FIG. 3 is a schematic circuit diagram of control apparatus of this invention which is manually resettable after it protectively deenergizes the load.

Another embodiment of the invention is illustrated in FIG. 3 and, like the circuit of FIG. 2, employs an additional thermistor S2. However, the thermistor is not thermally coupled to motor M and therefore does not sense its temperature. Thermistor S2 is connected in series with resistor R1 across supply leads L1 and L2. Thus upon connection of the supply leads to a source of AC power, thermistor S2 is self-heating. Preferably, thermistor S2 is also of a PTC thermistor material having a transition temperature above which the resistance thereof rises relatively abruptly. Because of this characteristic, when the supply leads are connected to the AC power source, thermistor S2 heats substantially to its transition temperature. As is understood by those skilled in the art, such a thermistor when employed in a self-heating mode is essentially self-regulating. That is, at its transition temperature, its resistance increases relatively rapidly to limit further self-heating and the thermistor is therefore maintained at the transition temperature virtually without regard to variations in supply voltage or ambient temperature.

Upon initial energization of the control by connection of the leads to the power source, thermistor S2, having a relatively low resistance, supplied initial triggering current through capacitor C1 and thermistor S1 (which is likewise in an unheated condition) to the gate terminal of triac Q, thereby to energize winding KW to supply the motor with power. After initial triggering of the triac Q in this manner, resistor R1 and capacitor C1 supply triggering current for "latching" triac Q in its conductive state as long as no overload condition occurs which would heat thermistor S1. However, upon a temperature rise of motor M indicating an overload or locked rotor condition, thermistor S1 is heated to limit the triggering current applied to the gate of triac Q and thereby causes it to become nonconductive, thereby deenergizing motor M. When motor M cools, the resistance of thermistor S1 once more becomes relatively low. However, triac Q is prevented from being reenergized because thermistor S2 remains self-heated because of the voltage appearing across leads L1 and L2. Thus it will be seen that thermistor S2 prevents reenergization of motor M until the supply leads are disconnected from the power source to permit thermistor S2 to cool. Thermistor S2 therefore permits manually resetting of the control by disconnecting the leads as described.

Figure 4:
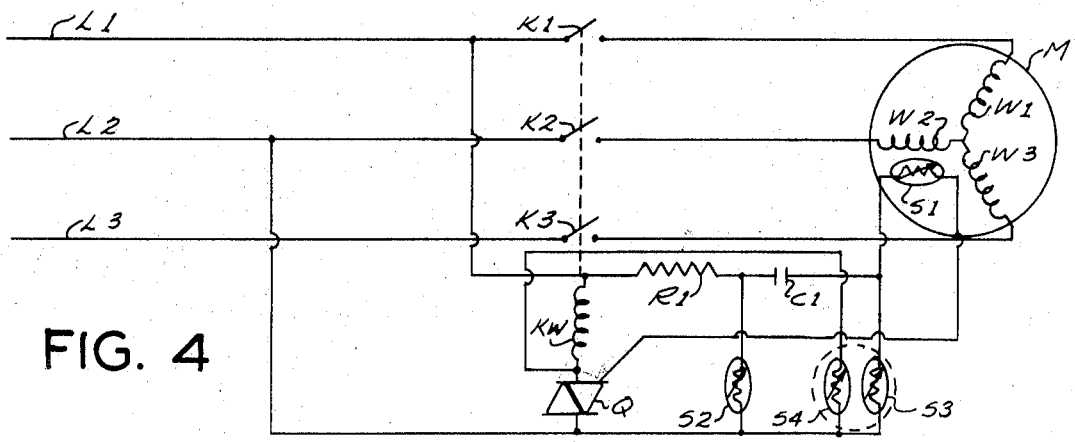
FIG. 4 is a schematic circuit diagram of a manually resettable control similar to that shown in FIG. 3 but additionally including means providing for a time delay after which the control automatically resets.

FIG. 4 is a circuit schematic diagram of another embodiment of this invention wherein there is provided time delay means responsive to termination of conduction between the main terminals of the current switching device upon overheating of the load. This time delay means provides a predetermined delay between protective deenergization of the load and subsequent reenergization thereof. Thermistor S2 is provided in the same fashion as in the circuit of FIG. 3. The circuit of FIG. 4 includes a third thermistor S3, connected with thermistor S1 between the connection to lead L2, i.e., one of the main terminals of triac Q, and the gate terminal of triac Q. Thermistor S3 is an NTC thermistor, i.e., it exhibits a negative temperature coefficient of resistivity. It is preferably of the type having a transition temperature above which the resistance thereof decreases relatively abruptly and thereby operates analogously to the PTC sharp-break thermistors previously described. A heater for NTC thermistor S3 comprises yet another thermistor S4 which is connected across the main terminals of triac Q so that when condition is terminated between the main terminals thermistor S4 will be energized. Thermistor S4 is preferably of the type having a transition temperature above which the resistance thereof increases relatively abruptly. The transition temperature of thermistor S4 exceeds that of thermistor S3 to insure that the latter may be heated to a temperature somewhat above its transition temperature.

In operation, the FIG. 4 circuit protectively deenergizes the load, i.e., motor M, if it overheats in the same manner as the circuit of FIG. 3. When this occurs, conduction is terminated between the main terminals of triac Q. Thus the voltage across triac Q energizes thermistor S4 causing it to heat to it its transition temperature in a manner identical with the self-heating operation of thermistor S2 in the circuit of FIG. 3. Thus thermistor S3 is also heated. Initially thermistor S3 exhibits a high resistance by virtue of its NTC sharp-break characteristic. However, when it is heated by thermistor S4, the resistance of thermistor S3 rapidly decreases when thermistor S3 reaches its transition temperature. Thus, until thermistor S3 is heated so that it exhibits a low resistance, no triggering current will be applied through thermistor S3 and thermistor S1 to the gate of triac Q. By varying the thermal time constant of either thermistor S3 or thermistor S4, or both, the time delay between protective deenergization of the load and subsequent reenergization by thermistor S3 may be varied over a wide a range. Thermistor S2 provides means for initially energizing the circuit and preventing automatic resetting before the time delay in the same manner as in FIG. 3.

Figure 5:
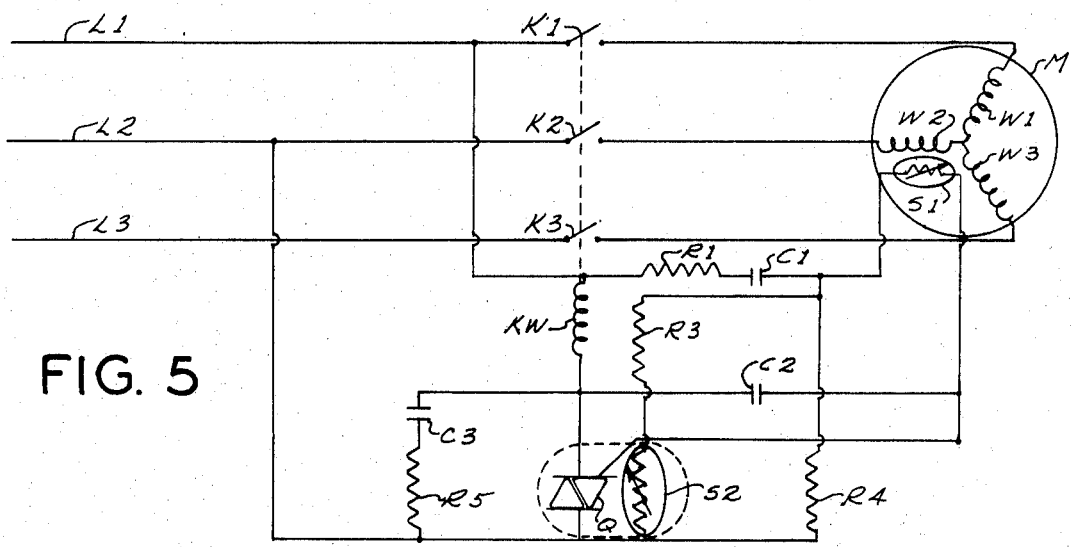
FIG. 5 is a schematic circuit diagram of an automatically resettable control which is a modification of the circuit of FIG. 1.

FIG. 5 illustrates a circuit very much like that shown in FIG. 1, but wherein the resistor R2 of FIG. 1 is replaced by a resistive network comprising resistor R3 in series with a thermistor S2 and another resistor R4 shunting this serial combination. Thermistor S2 is thermally coupled to triac Q, as by being mounted in thermally conductive relationship with a heat sink for triac Q. Thermistor S2 is a PTC thermistor, i.e., its resistance increases with increasing temperature. It will thus be seen that, since the resistance of thermistor S2 varies as a function of the temperature of triac Q, the effective resistance of the resistive network comprising thermistor S2, resistor R3 and resistor R4 will be increased as the temperature of triac Q increases. Accordingly, thermistor S2 acts to decrease the gate triggering current supplied to the gate terminal of triac Q by the network when the triac Q is at a high ambient temperature and will increase the gate-triggering current initially supplied to the triac to initiate conduction between its main terminals when the triac is at a low ambient temperature. In other words, thermistor S2 acts to stabilize the reset temperature at which triac Q can be retriggered to reenergize the load following a protective deenergization by the control.

It will also be seen that a capacitor C2 is connected between the gate terminal and the adjacent main terminal of triac Q. The control is also provided with a capacitor C3 and resistor R5 connected in series between the two main terminals of triac Q. Capacitor C2 acts to provide the control with greater immunity from the possibility that transients, i.e., "noise" in the supply voltage will cause undesirable triggering of triac Q. The series-connected resistor R5 and capacitor C3 comprise a *dv/dt* suppression network which acts to prevent triac Q from being unintentionally triggered by the voltage appearing across the main terminals of triac Q when it is in its nonconductive state and is at a high temperature. This *dv/dt* suppression network therefore acts to prevent a loss of gate control when triac Q is nonconductive and is at a high temperature, as where the load has been protectively deenergized but before triac Q has had an opportunity to cool.

In view of the above, it will be seen that the several objects of the invention are achieved and other advantageous results attained.

As various changes could be made in the above constructions without departing from the gist of the invention, it is intended that all matter contained in the above description or shown in the accompanying drawings shall be interpreted as illustrative.

I claim:

1. Apparatus for controlling the energization of an electrical load and which is responsive to overheating of the load for protective deenergization thereof, comprising:

a triggerable AC semiconductor current switching device having main and gate terminals, AC conduction between the main terminals being initiated by applying a triggering current to the gate terminal and being terminated when the triggering current is reduced below a predetermined triggering level;

means, interconnected with the AC current switching device for connection across an AC power source, for energizing the load in response to conduction between the main terminals of the current switching device;

a thermistor thermally coupled to the load and interconnected with the gate terminal of the current-switching device for controlling the flow of triggering current thereto; and means interconnected with the thermistor and with said gate terminal for supplying a triggering current for the AC current-switching device, said means being operative initially to supply triggering current to said gate terminal for initiating conduction between the main terminals of the AC switching device upon connection of the apparatus across the AC power source and then to supply triggering current to said gate terminal through said thermistor for latching the AC switching device in a state wherein conduction between the main terminals thereof is recurrently maintained, the thermistor reducing the triggering current below said predetermined triggering level when heated above a predetermined threshold corresponding to a maximum permissible temperature in the load whereby the load is protectively deenergized upon overheating thereof.

2. Control apparatus as set forth in claim 1 wherein said thermistor is a PTC thermistor having a transition temperature above which the resistance thereof rises relatively abruptly.

3. Control apparatus as set forth in claim 1 wherein said means for supplying a triggering current for the current switching device includes means for resetting the apparatus after the load has been protectively deenergized and has cooled whereby the load can only be reenergized at a temperature thereof less than said maximum permissible temperature.

4. Control apparatus as set forth in claim 3 wherein said means for resetting the apparatus includes a resistance connected with said thermistor between one of the main terminals and the gate terminal of the switching device, said resistance supplying the triggering current for initiating conduction between the main terminals of the current-switching device.

5. Control apparatus as set forth in claim 4 wherein said resistance comprises a second thermistor, said thermistor being a PTC thermistor.

6. Control apparatus as set forth in claim 5 wherein said second thermistor is self-heating upon connection of the apparatus to the AC power source whereby, after the load is protectively deenergized, said second thermistor supplies insufficient triggering current for initiating conduction between the main terminals of the switching device until the apparatus is disconnected from the AC power source to permit cooling of said second thermistor whereby said second thermistor provides means for manually resetting the apparatus.

7. Control apparatus as set forth in claim 5 wherein said second thermistor is also thermally coupled to the load and has a transition temperature above which the resistance thereof rises relatively abruptly, whereby said second thermistor provides means for automatically resetting the apparatus at a predetermined reset temperature of the load.

8. Control apparatus as set forth in claim 3 further comprising time delay means responsive to termination of conduction between the main terminals of the current-switching device upon overheating of the load for providing a predetermined delay between protective deenergization of the load and subsequent reenergization thereof.

9. Control apparatus as set forth in claim 8 wherein said time delay means includes an NTC thermistor having a transition temperature above which the resistance thereof decreases relatively abruptly, said NTC thermistor being connected with the first-said thermistor between one of the main terminals and the gate terminal of the switching device, and a heater for said NTC thermistor, the heater being connected across said main terminals whereby, when conduction between said main terminals is terminated, the heater heats said NTC thermistor, which, after said predetermined delay to reach said transition temperature, supplies current for retriggering the switching device.

10. Control apparatus as set forth in claim 9 wherein said heater is a PTC thermistor having a transition temperature above which the resistance thereof increases relatively abruptly.

11. Control apparatus as set forth in claim 5 wherein said second thermistor has a transition temperature above which the resistance thereof increases relatively abruptly.

12. Control apparatus as set forth in claim 5 wherein said second thermistor is thermally coupled to the switching device whereby the triggering current supplied to the switching device by said second thermistor for initiating conduction between said main terminals varies as a function of the temperature of the switching device.

13. Control apparatus as set forth in claim 12 wherein said second thermistor is connected in series with a resistance, and said thermistor and resistance are connected in parallel with a second resistance to constitute a temperature compensation network.

14. Control apparatus as set forth in claim 1 wherein said means for supplying a triggering current for the current-switching device includes a resistance and a capacitor connectable between one side of the AC power source to the gate terminal of the switching device through said thermistor.

15. Control apparatus as set forth in claim 1 further comprising a resistance and a capacitor connected in series across the main terminals of the current-switching device, and a capacitor connected between the gate terminal and one of the main terminals of the device for providing immunity from transient triggering.

16. Control apparatus as set forth in claim 1 wherein said current-switching device is a triac.